US008650048B1

(12) United States Patent
Hopkins, III et al.

(10) Patent No.: US 8,650,048 B1
(45) Date of Patent: Feb. 11, 2014

(54) METHOD AND SYSTEM FOR INSURING REAL PROPERTY IN WILDFIRE PRONE AREAS

(75) Inventors: John C. Hopkins, III, San Antonio, TX (US); Arthur Quentin Smith, Fredericksburg, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 487 days.

(21) Appl. No.: 12/769,563

(22) Filed: Apr. 28, 2010

(51) Int. Cl.
*G06Q 40/00* (2012.01)

(52) U.S. Cl.
USPC .................................. 705/4; 705/44

(58) Field of Classification Search
USPC .......................... 705/2–4, 15–45
See application file for complete search history.

(56) References Cited

U.S. PATENT DOCUMENTS

| 7,343,310 B1* | 3/2008 | Stender ............................ 705/4 |
| 2005/0055248 A1* | 3/2005 | Helitzer et al. ................... 705/4 |
| 2009/0259581 A1 | 10/2009 | Horowitz et al. |
| 2009/0265193 A1 | 10/2009 | Collins et al. |
| 2009/0266565 A1* | 10/2009 | Char .............................. 169/45 |

FOREIGN PATENT DOCUMENTS

WO  WO 01/63534 A2  8/2001

OTHER PUBLICATIONS

Chapman et al., "The use of geographical information systems in climatology and meteorology," Progress in Physical Geography Sep. 2003; 27(3):313-330; retrieved from the Internet: <http://labara.eas.gatech.edu/~xxi3/web/document/gisclimate.pdf>.

* cited by examiner

*Primary Examiner* — Hai Tran
(74) *Attorney, Agent, or Firm* — Kilpatrick Townsend & Stockton LLP

(57) ABSTRACT

A method of providing an insurance policy for a home includes providing a computer having a processor and deploying a plurality of sensors in a vicinity of the home. The method also includes receiving data from the plurality of sensors. The data includes information related to environmental factors associated with the home. The method further includes transmitting the information related to the environmental factors to the computer, computing, by the processor, a fire risk associated with the home using the information, and computing, by the processor, an insurance premium for the insurance policy using the computed fire risk.

21 Claims, 7 Drawing Sheets

METHOD AND SYSTEM FOR INSURING REAL PROPERTY IN WILDFIRE PRONE AREAS

BACKGROUND OF THE INVENTION

Customers demand more of the products and services they use than ever before. They insist that the companies they deal with on a regular basis provide them greater and greater levels of accuracy and more tailored service offerings. Companies configure and operate ever increasing numbers of computer systems to achieve this. Using sources of information that have traditionally been unavailable when servicing these customers is now expected.

SUMMARY OF THE INVENTION

The present invention relates generally to insurance systems. More specifically, the present invention relates to methods and systems for underwriting property insurance policies in wildfire prone areas. Merely by way of example, the invention has been applied to a method of combining information from a plurality of sensors disposed in the vicinity of a home to estimate the risk of wildfires and compute the price of insurance using this information. The methods and techniques can be applied to a variety of risk assessment systems.

According to an embodiment of the present invention, a method of providing an insurance policy for a home is provided. The method includes providing a computer having a processor and deploying a plurality of sensors in a vicinity of the home. The method also includes receiving data from the plurality of sensors. The data includes information related to environmental factors associated with the home. The method further includes transmitting the information related to the environmental factors to the computer, computing, by the processor, a fire risk associated with the home using the information, and computing, by the processor, an insurance premium for the insurance policy using the computed fire risk.

According to another embodiment of the present invention, a method of offering an insurance policy on a property to a user is provided. The method includes providing a computer having a processor and receiving an address of the property from the user. The method also includes accessing an insurance database and determining, using the insurance database, that the property is uninsurable. The method further includes receiving data from a plurality of sensors associated with the property, computing, by the processor, a fire risk using the received data, computing, by the processor, a policy premium using the computed fire risk, and offering the insurance policy to the user.

According to a specific embodiment of the present invention, a computer-readable storage medium includes computer-readable instructions tangibly embodied on the computer-readable storage medium, which, when executed by a data processor, provide an insurance policy for a home. The plurality of instructions includes instructions that cause the data processor to receive data from a plurality of sensors deployed in a vicinity of the home. The data includes information related to environmental factors associated with the home. The plurality of instructions also include instructions that cause the data processor to transmit the information related to the environmental factors to a fire hazard analysis engine having a processor and instructions that cause the data processor to compute a fire risk associated with the home using the information. The plurality of instructions further include instructions that cause the data processor to compute an insurance premium for the insurance policy using the computed fire risk.

According to another embodiment of the present invention, a method of managing insurance premiums for a home is provided. The method includes providing a computer having a processor, deploying a plurality of sensors in a vicinity of the home, and receiving data from the plurality of sensors. The data includes information related to environmental factors associated with the home. The method also includes analyzing the data to determine that one or more fire mitigation procedures have been performed in association with the home and transmitting information related to the one or more fire mitigation procedures to the computer. The method further includes computing a fire risk associated with the home using the information and computing an insurance premium for the insurance policy using the computed fire risk.

Numerous benefits are achieved by way of the present invention over conventional techniques. For example, embodiments of the present invention provide insurance premiums that are tailored to the environmental factors associated with a particular home. Additionally, embodiments of the present invention enable an insurance company to offer fire insurance on homes that are conventionally uninsurable due to the general fire risk in the vicinity of the home. These and other embodiments of the invention along with many of its advantages and features are described in more detail in conjunction with the text below and attached figures.

DETAILED DESCRIPTION OF THE INVENTION

Embodiments of the present invention relate to technologies to facilitate homeowners and/or renters in finding, acquiring, insuring, and/or maintaining real property. Technologies related to embodiments of the present invention support a homeowner/renter, for example, a member of a membership organization, with the initial preparation associated with the purchase of a home and/or rental of a home/apartment. Such initial preparation can include advice and counseling related to a person's ability to afford a home or apartment, development of a financial plan to facilitate the acquisition, web-enabled self-service systems (e.g., home purchase calculators) used to determine financial goals and requirements, and/or on-line member communities related to homeownership and/or rental.

After a person completes initial preparation, technologies related to embodiments of the present invention assist the person in finding suitable properties through the use of rent/buy listings including information tailored to each person's interests and background. For example, preapproval of the person for mortgage rates and/or homeowner's/renter's insurance can be used to provide rich information content as part of the search process. On-line member communities can be used to assist users in finding property that is suitable for the particular user's interests and income.

Additionally, technologies related to embodiments of the present invention provide for assistance in the purchase/rental transaction, including obtaining a mortgage and provision of assistance in negotiating the purchase or lease. Protection of the newly acquired home or rented property is also related to embodiments of the present invention, in one of several forms including homeowner's insurance, mortgage life insurance, renter's insurance, flood insurance, personal property insurance, home security systems, home warranties, and the like.

Moreover, technologies related to embodiments of the present invention provide a person with assistance in moving to, maintaining and/or renovating, and/or refinancing the newly purchased or rented property. Thus, embodiments of the present invention relate to technologies that provide a one-stop home resource for delivering home solutions related to buying, selling, renting, and/or owning real property. In particular embodiments, members of a membership organization utilize the methods and systems described herein to manage their real property interests and interact with other community members to enable new concepts related to homes and other real property.

Figure 1:
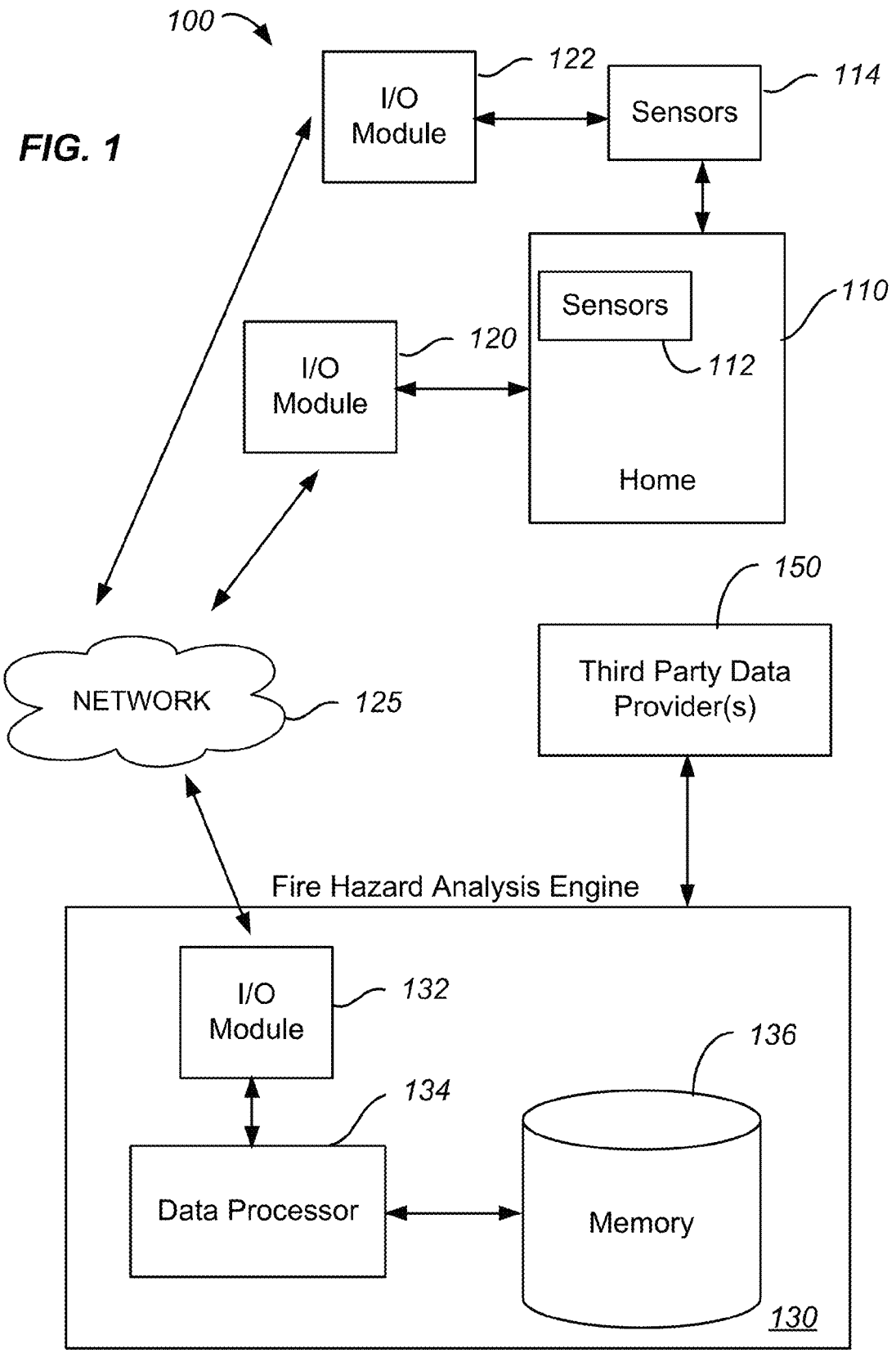
FIG. 1 is a high level schematic diagram illustrating an insurance underwriting system according to an embodiment of the present invention.

FIG. 1 is a high level schematic diagram illustrating an insurance underwriting system according to an embodiment of the present invention. The insurance underwriting system 100 includes a home 110 and a plurality of sensors 112 114 that are disposed in the home, on the home, and/or adjacent to the home. The plurality of sensors 112 114 provide information on meteorological conditions related to wildfires. This information can also be referred to as environmental factors associated with the home. The sensors can include, but are not limited to: soil sample sensors, thermometers, humidity sensors, wind sensors, cameras located on the property, thermal sensors, infrared and radiation sensors, animal activity and migration sensors, mobile biological sensors, vegetation and fuel loads monitors, and the like. Imaging processing and other data processing, as described in additional detail throughout the present specification, can be performed by the sensor, in post-processing, or combinations thereof. Sensors can be grouped into one of several types of groupings, including internal and external to a home or other structure, sensors associated with a home (e.g., a wind sensor mounted on a roof of a home) and sensors associated with a neighborhood (e.g., a wind mounted on a cell tower in the neighborhood). In one embodiment, the plurality of sensors form a mesh network of sensors that can provide information related to the environmental factors or conditions associated with a home. Mesh networks can be considered as one type of ad hoc network. In a mesh network, each node in the network may act as an independent router, regardless of whether it is connected to another network or not. This connection model enables for communication between nodes and reconfiguration around broken or blocked paths by node hopping.

Utilizing the plurality of sensors 112 114, data on nitrogen content in the soil, wind speed and direction, humidity level, temperature, local fuel load, spatial weather (e.g., rainfall distribution, temperature, relative humidity), soil-water balance, biomass estimations, carbon stocks, stock changes, land-atmosphere $CO_2$ exchange, greenhouse gas emissions, Global Observation of Forest Cover and Global Observation of Landcover Dynamics (GOFC-GOLD); vegetation levels, and the like can be used to determine a flammability rating for the home 110. According to some embodiments of the present invention, the sensor data described herein is tracked as a function of time to provide insight into changes in the parameters that are measured. Utilizing one or more of the sensors described herein, synergies in data analysis are achieved, enabling an insurance company to determine risk and properly set premiums for insurance policies on homes that, if considered in the aggregate, are uninsurable, but if considered as an individual home and analyzed using the data described herein, become insurable.

The various sensors positioned in the vicinity of the home can be networked using wired or wireless technology in order to integrate the data provided by the sensors. Additionally, the sensors can communicate their data to other portions of the network through the I/O modules 120 122. Thus, embodiments of the present invention provide for both local interconnectivity as well as for global connectivity. As illustrated in FIG. 1, data from the sensors is transmitted through the network 125 to the fire hazard analysis engine 130 using I/O modules 120 122. Control of the sensors can also be effected through control signals transported through the network 125 using the I/O modules 120 122. As discussed above, a mesh network is utilized in some embodiments, providing the functionality in which data can be transmitted from a module (e.g., a node) farthest from a central location to another module closer to the central location. Thus, for this network implementation, data moves from the ends of the network to the central portion of the network. In some embodiments, the I/O modules 120 122 are combined into a single communications module as appropriate to the particular application. One of ordinary skill in the art would recognize many variations, modifications, and alternatives.

The sensors can be maintained by the homeowner, a community-based group such as a homeowner's association, a third party data provider, and/or the insurance company. As an example, if an insurance company insures a number of homes in a neighborhood, wind sensors could be placed throughout the neighborhood to supplement data from sensors mounted on particular homes. Sensors could be installed by the homeowner to provide data to the insurance company, resulting in a discount in the premium charged to the customer. In addition to sensors mounted in/on/around a home or in the vicinity of the home as illustrated in FIG. 1, additional sensor data can come from remote sensors not associated with a particular home. These remote sensors include cameras mounted in aerial vehicles to provide aerial photographs, satellite imagery, light detection and ranging (LIDAR), and other data sources. As illustrated in FIG. 1, the data provided by sensors 112 and 114 can be supplemented with data from third party data providers 150. The data from third party data providers can be integrated with the data from the sensors by the fire hazard analysis engine. Such additional data can include intermittent data from local sources: unusual air, unusual winds, and the like. This data can be provided by personal weather stations in people's homes, community weather stations, etc. In this way, data from a variety of data streams are integrated to determine the fire risk for a particular home.

Utilizing data from the sensors described herein, one or more processors can be used to compute a model that predicts the likelihood of a fire event. Thus, the data described herein can be utilized to analyze conditions that spawn fires and/or lead to the spread of fires. As a result of the computations made possible using the data from the sensors, variable insurance rates are offered to customers in an embodiment as a function of the wildfire risk. As the conditions around a house improve with respect to fire risk, the premiums paid by the insured will decrease. Thus, embodiments of the present invention provide variable rate policies for which the premiums are a function of the wildfire conditions as determined, in part, through use of the sensors illustrated in FIG. 1.

The following are examples of models and computations performed using environmental factors. The Canadian Forest Fire Weather Index (FWI) System includes the Fine Fuel Moisture Code (FFMC), which is a numerical rating of the moisture content of litter and other cured fine fuels. This code is an indicator of the relative ease of ignition and flammability of fine fuel. The Duff Moisture Code (DMC) is a numerical rating of the average moisture content of loosely compacted organic layers of moderate depth. This code gives an indication of fuel consumption in moderate duff layers and medium-size woody material. The Drought Code (DC) is a numerical rating of the average moisture content of deep, compact, organic layers. This code is a useful indicator of seasonal drought effects on forest fuels, and amount of smoldering in deep duff layers and large logs. The Initial Spread Index (ISI) is a numerical rating of the expected rate of fire spread. It combines the effects of wind and the FFMC on rate of spread without the influence of variable quantities of fuel. The Buildup Index (BUI) is a numerical rating of the total amount of fuel available for combustion that combines the DMC and the DC. The Fire Weather Index (FWI) is a numerical rating of fire intensity that combines the ISI and the BUI. It is suitable as a general index of fire danger throughout the forested areas of Canada and Eurasia.

In contrast with conventional policies that are offered for a fixed price for a predetermined term (e.g., one year at a fixed premium), an insurance company can utilize the methods and systems described herein to provide variable rate pricing. As an example, the price for a fire policy could vary on a daily/weekly/etc. basis as factors driving wildfire creation and spread vary. Using the sensors to detect a decrease in relative humidity and a resulting increase in fire danger, the insurance company could increase the policy premiums. Thus, embodiments of the present invention provide greater flexibility in pricing than available through conventional policies.

As an example, customers of an insurance company can have much more active involvement in the pricing of their insurance policies. In this way, the customer can exercise more control over the risk that the customer wants to bear. A traditional one-year blanket policy can be purchased at a higher premium or a series of short-term policies can be purchased in which the premium varies as a function of the fire risk. Additionally, embodiments of the present invention enable a customer to reduce the fire risk of their property and accrue benefits in lower premiums. For example, by clearing brush, which can be verified by the insurance company using the on-site sensors, the fire risk and the policy premium can be reduced. By installing additional sensors on the property, the quality of data provided to the insurance company, including information related to the environmental factors associated with the home, can be improved, resulting in additional premium reductions. Thus, embodiments of the present invention enable a home owner to be more actively involved in the risk/reward calculations related to fire insurance.

Figure 6:
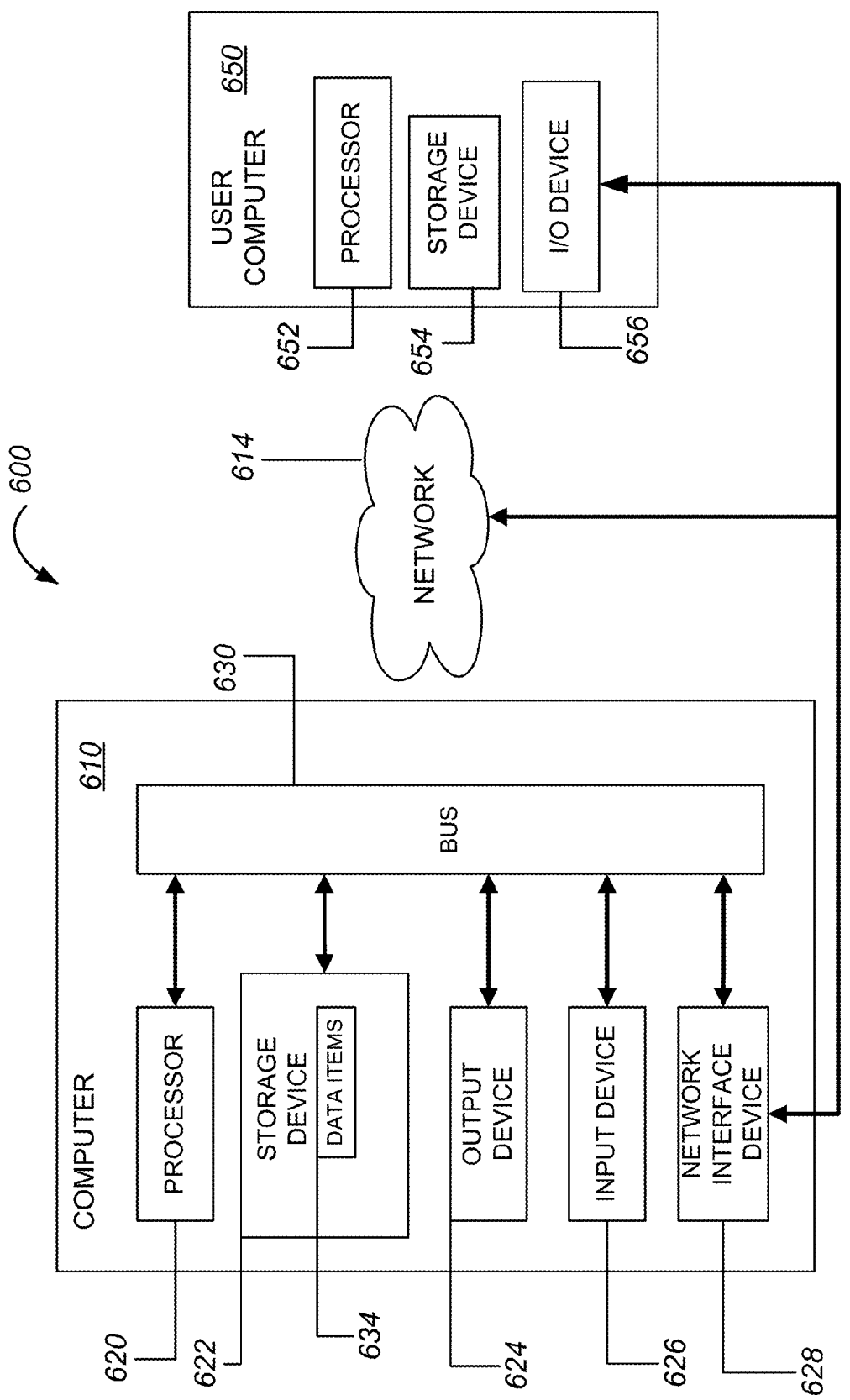
FIG. 6 is high level schematic diagram illustrating a computer system including instructions to perform any one or more of the methodologies described herein.

Referring to FIG. 1, the insurance underwriting system 100 also includes a fire hazard analysis engine 130. The fire hazard analysis engine 130 includes an I/O module 132, a data processor 134 (also referred to as a processor), and a memory 136. The description provided in relation to processors and memory in FIG. 6 is also applicable to data processor 134 and memory 136. The data processor and memory are used in computing a fire risk associated with home 110 as well as insurance premiums in some embodiments. Data from third party data provider(s) 150 can also be received by the fire hazard analysis engine 130 using I/O module 132. This data can be utilized in computing the fire risk for home 110 as well as the insurance premium.

Figure 2:
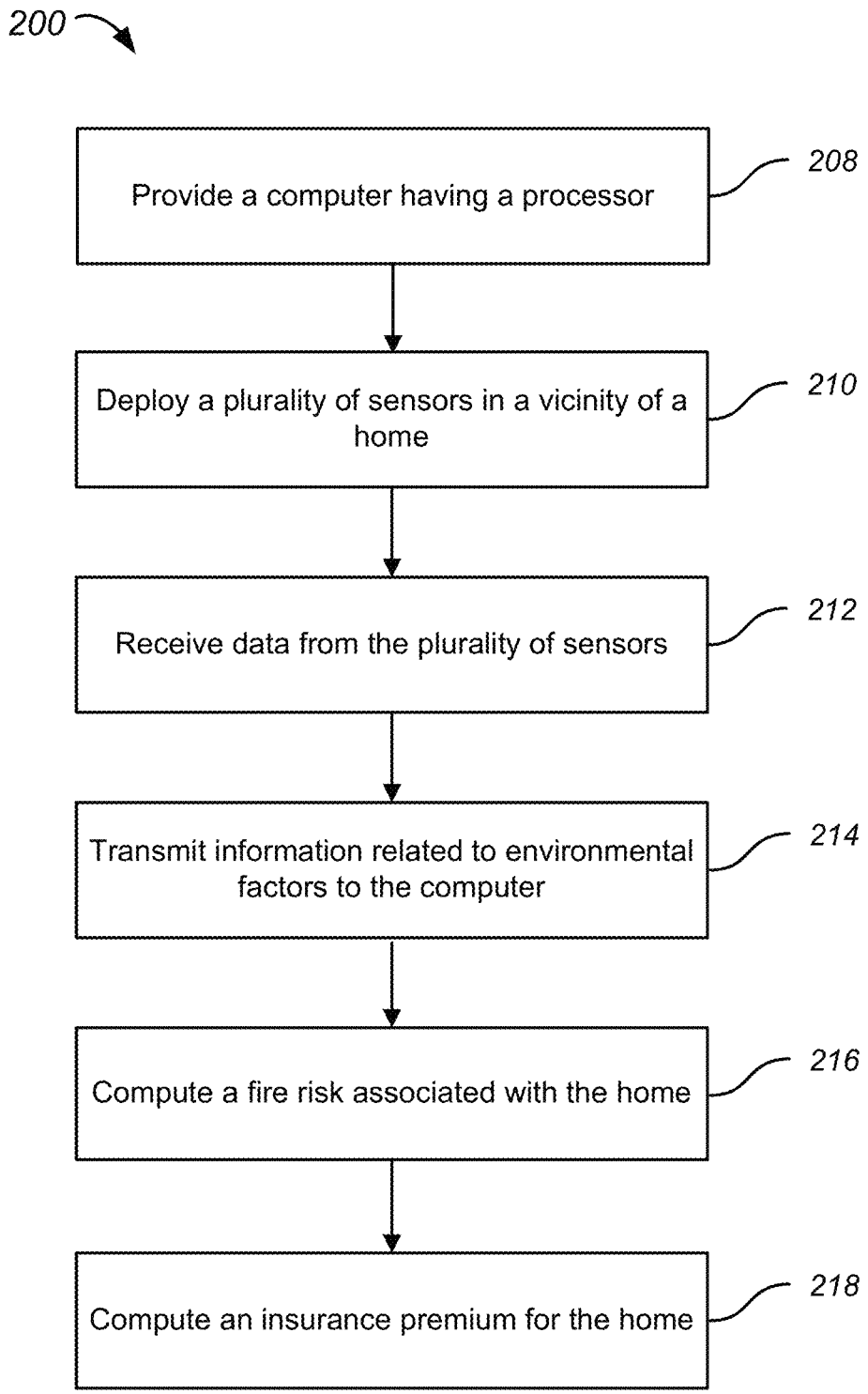
FIG. 2 is a high level flowchart illustrating a method of pricing property insurance according to an embodiment of the present invention.

FIG. 2 is a high level flowchart illustrating a method of pricing property insurance according to an embodiment of the present invention. The method 200 includes providing a computer having a processor (208) and deploying a plurality of sensors in a vicinity of a home (210). The computer may be provided in the form of the fire hazard analysis engine 130 illustrated in FIG. 1. The plurality of sensors can include at least one sensor mounted on the home or at least two sensors selected from the group consisting of a humidity sensor, a temperature sensor, a wind sensor, and a camera. Other sensors are also included within the scope of the present invention as discussed in relation to FIG. 1. Multiple sensors can provide a synergy not available using a single sensor. The method also includes receiving data from the plurality of sensors (212). The data comprises information related to environmental factors associated with the home, also referred to as information related to the meteorological conditions in the vicinity of the home. The information related to the environmental factors is transmitted to the computer (e.g., the fire hazard analysis engine 130) (214).

The method further includes, computing, by the processor, a fire risk associated with the home using the information (216) and computing, by the processor, an insurance premium for the home using the computed fire risk (218). In an embodiment, the insurance premium can be valid for a period of time less than a month in duration, for example, less than a week in duration. In a particular embodiment, the insurance premium is a daily premium. In addition to providing an insurance policy, embodiments of the present invention can provide fire mitigation procedures to customers using the computed fire risk.

According to an alternative embodiment, the method 200 further includes receiving second data from a second plurality of sensors deployed in the vicinity of a second home. The second home can be in the same neighborhood as the first home. The second data includes second information related to environmental factors associated with the second home. The method also includes transmitting the second information to the computer (e.g., the fire hazard analysis engine 0130), computing a modified fire risk associated with the home using the second information, and computing a modified insurance premium for the home using the modified fire risk.

It should be appreciated that the specific steps illustrated in FIG. 2 provide a particular method of pricing property insurance according to an embodiment of the present invention. Other sequences of steps may also be performed according to alternative embodiments. For example, alternative embodiments of the present invention may perform the steps outlined above in a different order. Moreover, the individual steps illustrated in FIG. 2 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 3:
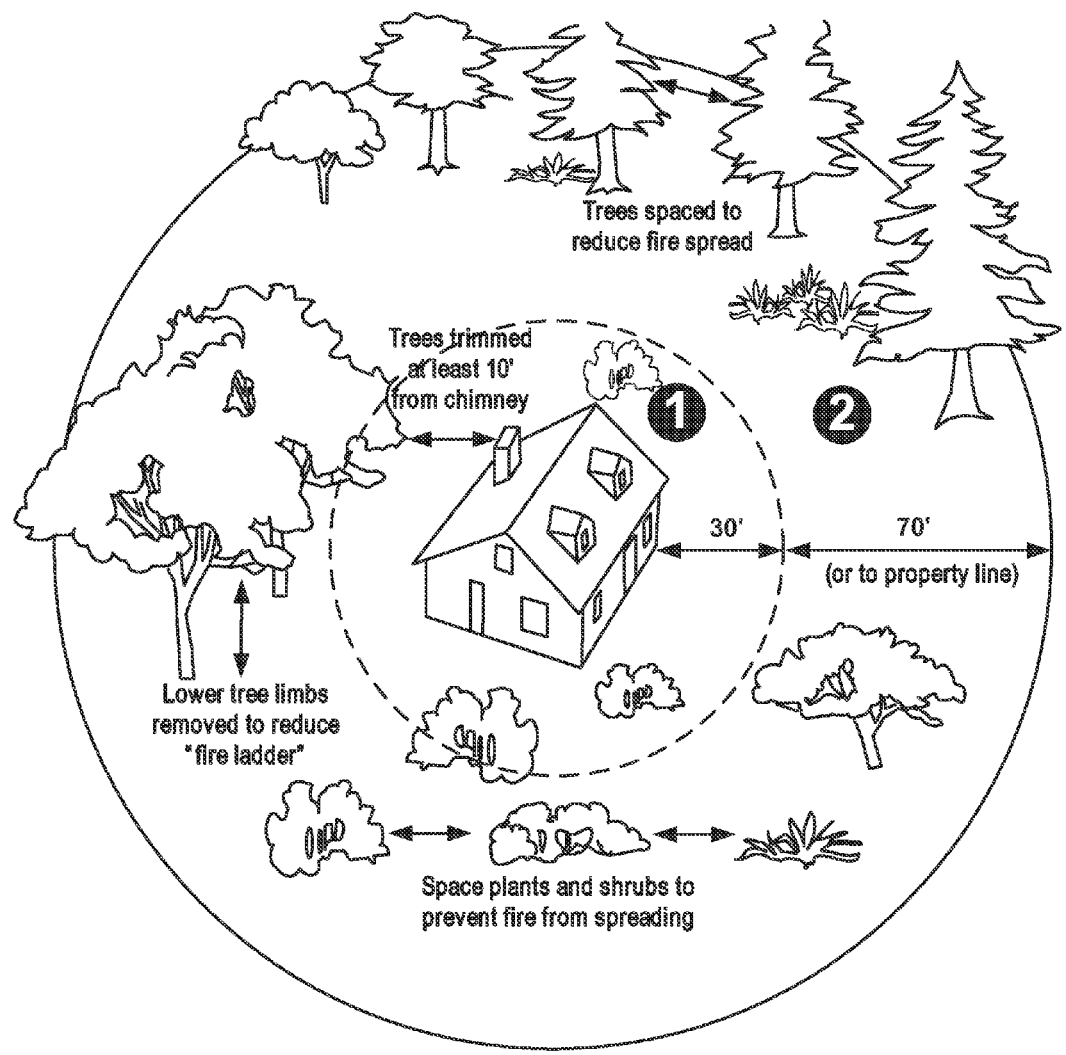
FIG. 3 is a diagram illustrating a 100' defensible space law according to an embodiment of the present invention.

FIG. 3 is a diagram illustrating a 100' defensible space law according to an embodiment of the present invention. One or more of the sensors described herein can be utilized to determine a homeowner's compliance with the 100' defensible space law. For example, cameras mounted on a home can be used to determine if the area surrounding the home is free of brush and other fuel. Data, in the form of images, video, data based on images or video, or the like can be transmitted to the insurance company for use in determining the applicable premium. As an example, image processing software could be used to process one or more images of the area surrounding the home to determine the fuel load (e.g., undergrowth) in the vicinity of the home. If the area surrounding the home is free from brush in compliance with the illustrated law, then this typically indicates that the homeowner is attempting to comply with steps that result in a reduced risk of fire damage. Accordingly, the premium for this home will be decreased for a predetermined period.

Outputs of the fire hazard analysis engine 130 can include the likelihood of fire for a particular house, a neighborhood, or the like, the likelihood of having to evacuate a home, likely damage due to fire, on-property mitigation options, and the like. As an example of on-property mitigation options, a condition for insuring a particular home could be that the owner clears brush near the home, which could be verified using data collected by the on-property sensors or other suitable data collection methods.

Embodiments of the present invention provide for localized data collection and fire hazard analysis in comparison with techniques based on zip codes or other large scale grouping of homes. As a result, policies can be written and premiums can be tailored to a particular home, enabling insurance companies to offer policies in areas previously excluded from receiving insurance. As an example, the underwriting formula could be based on the current soil nitrogen content, wind level, and temperature associated with a home. These data inputs will enable a computation of a fire risk, not for a state, county, or city, for the particular home with which some of the sensors are associated. Since the data from the sensors has granularity down to the level of a single home, different rate structures can be offered to different customers, tailoring the product to the particular risk associated with each home.

Figure 4:
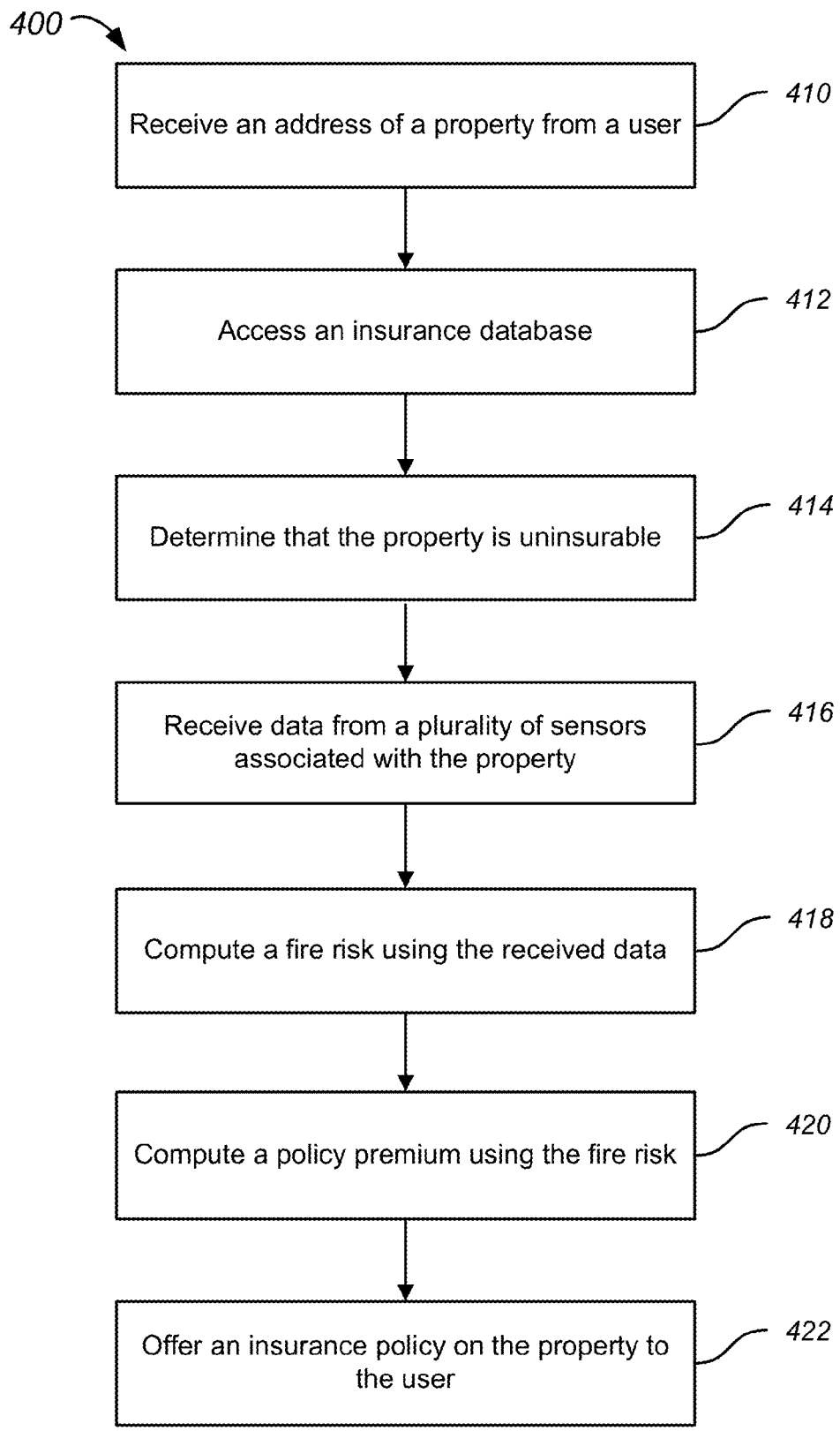
FIG. 4 is a high level flowchart illustrating a method of offering property insurance according to an embodiment of the present invention.

According to another embodiment of the present invention, properties that were conventionally uninsurable can be insured. FIG. 4 is a high level flowchart illustrating a method of providing insurance for a conventionally uninsurable property. The method 400 includes receiving an address of a property from a user (410) and accessing an insurance database (412). The method also includes determining, using the insurance database, that the property is uninsurable (414). This initial decision that the property is uninsurable may be based on a zip code categorization of an area as being too high of a fire risk, being located too close to the wildlife/urban interface, or the like. Typically, at this point, the insurance company will notify the potential customer that the property is not insurable and no policy will be sold. Because embodiments of the present invention provide specific data related to the environmental conditions associated with a particular home, insurance companies utilizing embodiments of the present invention can potentially extend insurance coverage to these uninsurable properties.

The method 400 further includes receiving data from a plurality of sensors associated with the property (416). As described in relation to FIG. 1, the plurality of sensors can include a wind sensor mounted on a house on the property, a temperature sensor located on the property, a humidity sensor located on the property, a soil sensor disposed in the property, and the like. A fire risk is computed using the received data (418), a policy premium is computed using the computed fire risk (420), and an insurance policy is offered to the user (422).

It should be appreciated that the specific steps illustrated in FIG. 4 provide a particular method of providing insurance for a conventionally uninsurable property according to an embodiment of the present invention. Other sequences of steps may also be performed according to alternative embodiments. For example, alternative embodiments of the present invention may perform the steps outlined above in a different order. Moreover, the individual steps illustrated in FIG. 4 may include multiple sub-steps that may be performed in various sequences as appropriate to the individual step. Furthermore, additional steps may be added or removed depending on the particular applications. One of ordinary skill in the art would recognize many variations, modifications, and alternatives.

In contrast with conventional insurance policies, which are not tailored to the fire risk of a particular home, embodiments of the present invention enable a property that is conventionally uninsurable to be insured. In this manner, the availability of the localized data described herein enables an insurance company to reverse the initial decision that the property was uninsurable and offer a policy to the customer. Thus, the technology deployed and utilized according to embodiments of the present invention enables new business opportunities not available using conventional techniques.

Figure 5:
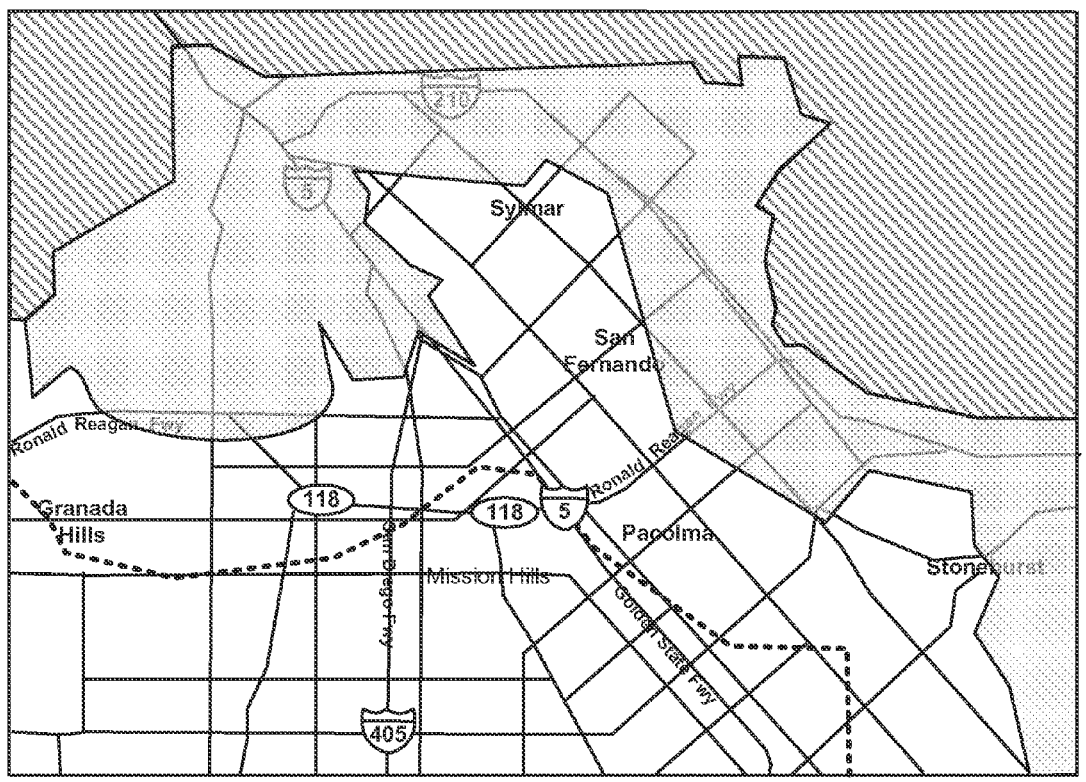
FIG. 5 is a high level map illustrating changing fire dynamics according to an embodiment of the present invention.

As an example, an insurance company writing a conventional fire insurance policy, will typically not underwrite fire insurance policies on properties located within a predetermined distance of the edge of the forest. Referring to FIG. 5, insurance companies will not typically write policies in the wildlife/urban interface (WUI). In fact, homes within a predetermined distance of the WUI, for example, within 1.5 miles of the WUI will typically be uninsurable. The boundary of this 1.5 mile distance is illustrated in FIG. 5. Thus, in addition to the homes in the WUI, homes within a predetermined distance of the WUI will typically be uninsurable because of the high risk associated with the properties adjacent the WUI.

According to embodiments of the present invention, rather than using this broad brush to determine insurability and premiums, homes within these areas can be insured through utilization of data that is specific to each home in order to determine the fire risk for a particular home and the corresponding premium. Thus, embodiments of the present invention open up new areas of opportunity for an insurance company, enabling the sale of policies in areas that were previously uninsurable.

In addition to previously uninsurable policy holders receiving policies, the premiums for policies can be lowered for homes with reduced fire risk as determined using the sensor information. Such premium reductions will provide an incentive for home owners to install sensors or allow the insurance company or a third party to install the sensors and then provide the insurance company with data from the sensors. The monitoring functions (and potential mitigation techniques) enabled by the sensors described herein enables the risk of fire to be reduced, which is reflected in lower insurance premiums.

The insurance premium paid by the insured can be considered to include the costs associated with marketing and offering the insurance policy, the profit made by the insurance company, and the reserves held by the insurance policy in anticipation of claims to be made on the policy. According to embodiments of the present invention, the reserves are segregated into two pools: personal reserves associated with a particular policy and group reserves held for the collective group. Portions of the premiums are divided between these two reserve pools. When the risk of fire danger increases, rather than increasing the premium in response to the higher fire risk, a portion of the personal reserves could be drawn down and moved to the group reserves. Because the insured is consuming some of their personal reserves, the increase in fire risk is transparent to the insured. At a later time, when the risk is reduced by natural occurrences or otherwise, the amount of the premium allocated to the personal reserve could be increased once again. Using this method of apportioning reserves, the insured can be buffered from the variations in fire risk. Accordingly, prices for the fire policy can be leveled out for the insured.

According to an embodiment of the present invention, a method of accounting for reserves is provided. The method includes providing personal reserves associated with a property and collective reserves associated with a group of properties including the property. The method also includes receiving inputs from sensors associated with the property and determining a fire risk for the property. The sensors can be any one of the sensors discussed throughout the present specification. The method further includes computing a premium for the property using the determined fire risk. If the computed premium is greater than a previous premium, a portion of the personal reserves are transferred to the collective reserves to offset the increase in the computed premium. A quoted premium is calculated that is less than the computed premium and greater than or equal to the previous premium.

Utilizing embodiments of the present invention, daily pricing is enabled based on the data provided through the sensors and leveling of this daily pricing is enabled by the multiple reserve pools.

According to some embodiments, the data collected from sensors mounted in, on, or adjacent to the home is combined with geographical information system (GIS) data to provide additional insight into the fire risk associated with a particular property. As an example, if a home is adjacent to a cliff that provides a natural fire break, this information can be combined with current data to compute the fire risk associated with the home.

FIG. 6 is a high level schematic diagram of a computer including instructions to perform any one or more of the methodologies described herein. A system 600 includes a computer 610 connected to a network 614. The computer 610 includes a processor 620 (also referred to as a data processor), a storage device 622, an output device 624, an input device 626, and a network interface device 628, all connected via a bus 630. The processor 620 represents a central processing unit of any type of architecture, such as a CISC (Complex Instruction Set Computing), RISC (Reduced Instruction Set Computing), VLIW (Very Long Instruction Word), or a hybrid architecture, although any appropriate processor may be used. The processor 620 executes instructions and includes that portion of the computer 610 that controls the operation of the entire computer. Although not depicted in FIG. 6, the processor 620 typically includes a control unit that organizes data and program storage in memory and transfers data and other information between the various parts of the computer 610. The processor 620 receives input data from the input device 626 and the network 614 reads and stores code and data in the storage device 622 and presents data to the output device 624.

Although the computer 610 is shown to contain only a single processor 620 and a single bus 630, the disclosed embodiment applies equally to computers that may have multiple processors and to computers that may have multiple busses with some or all performing different functions in different ways.

The storage device 622 represents one or more mechanisms for storing data. For example, the storage device 622 may include read-only memory (ROM), random access memory (RAM), magnetic disk storage media, optical storage media, flash memory devices, and/or other machine-readable media. In other embodiments, any appropriate type of storage device may be used. Although only one storage device 622 is shown, multiple storage devices and multiple types of storage devices may be present. Further, although the computer 610 is drawn to contain the storage device 622, it may be distributed across other computers, for example on a server.

The storage device 622 includes a controller (not shown in FIG. 6) and data items 634. The controller includes instructions capable of being executed on the processor 620 to carry out the methods described more fully throughout the present specification. In another embodiment, some or all of the functions are carried out via hardware in lieu of a processor-based system. In one embodiment, the controller is a web browser, but in other embodiments the controller may be a database system, a file system, an electronic mail system, a media manager, an image manager, or may include any other functions capable of accessing data items. Of course, the storage device 622 may also contain additional software and data (not shown), which is not necessary to understand the invention.

Although the controller and the data items 634 are shown to be within the storage device 622 in the computer 610, some or all of them may be distributed across other systems, for example on a server and accessed via the network 614.

The output device 624 is that part of the computer 610 that displays output to the user. The output device 624 may be a liquid crystal display (LCD) well-known in the art of computer hardware. But, in other embodiments the output device 624 may be replaced with a gas or plasma-based flat-panel display or a traditional cathode-ray tube (CRT) display. In still other embodiments, any appropriate display device may be used. Although only one output device 624 is shown, in other embodiments any number of output devices of different types, or of the same type, may be present. In an embodiment, the output device 624 displays a user interface.

The input device 626 may be a keyboard, mouse or other pointing device, trackball, touchpad, touch screen, keypad, microphone, voice recognition device, or any other appropriate mechanism for the user to input data to the computer 610 and manipulate the user interface previously discussed. Although only one input device 626 is shown, in another embodiment any number and type of input devices may be present.

The network interface device 628 provides connectivity from the computer 610 to the network 614 through any suitable communications protocol. The network interface device 628 sends and receives data items from the network 614.

The bus 630 may represent one or more busses, e.g., USB (Universal Serial Bus), PCI, ISA (Industry Standard Architecture), X-Bus, EISA (Extended Industry Standard Architecture), or any other appropriate bus and/or bridge (also called a bus controller).

The computer 610 may be implemented using any suitable hardware and/or software, such as a personal computer or other electronic computing device. Portable computers, laptop or notebook computers, PDAs (Personal Digital Assistants), pocket computers, appliances, telephones, and mainframe computers are examples of other possible configurations of the computer 610. For example, other peripheral devices such as audio adapters or chip programming devices, such as EPROM (Erasable Programmable Read-Only Memory) programming devices may be used in addition to, or in place of, the hardware already depicted.

The network 614 may be any suitable network and may support any appropriate protocol suitable for communication to the computer 610. In an embodiment, the network 614 may support wireless communications. In another embodiment, the network 614 may support hard-wired communications, such as a telephone line or cable. In another embodiment, the network 614 may support the Ethernet IEEE (Institute of Electrical and Electronics Engineers) 802.3x specification. In another embodiment, the network 614 may be the Internet and may support IP (Internet Protocol). In another embodiment, the network 614 may be a local area network (LAN) or a wide area network (WAN). In another embodiment, the network 614 may be a hotspot service provider network. In another embodiment, the network 614 may be an intranet. In another embodiment, the network 614 may be a GPRS (General Packet Radio Service) network. In another embodiment, the network 614 may be any appropriate cellular data network or cell-based radio network technology. In another embodiment, the network 614 may be an IEEE 802.11 wireless network. In still another embodiment, the network 614 may be any suitable network or combination of networks. Although one network 614 is shown, in other embodiments any number of networks (of the same or different types) may be present.

A user computer 650 can interact with computer 610 through network 614. The user computer 650 includes a processor 652, a storage device 654, and an input/output device 656. The description related to processor 620 and storage device 622 is applicable to processor 652 and storage device 654. As an example, the user computer 650 can be a personal computer, laptop computer, or the like, operated by a member of a membership organization. Using the user computer 650, the member can then interact with computer 610 operated by the membership organization through network 614 in order to access web pages or the like.

Figure 7:
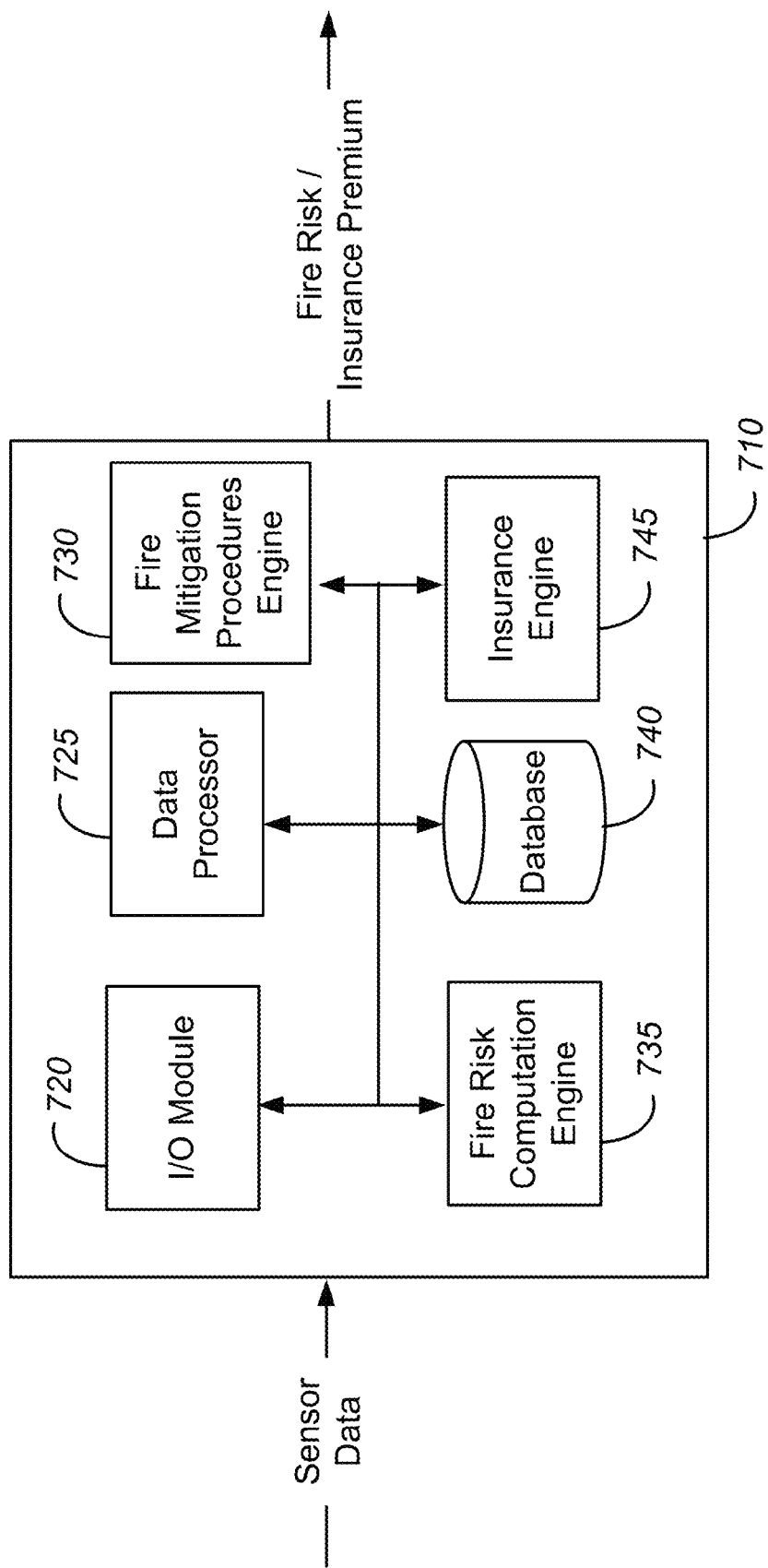
FIG. 7 is a high level block diagram of an apparatus for processing and using sensor data in accordance with an example embodiment.

FIG. 7 is a high level block diagram of an apparatus for processing and using sensor data in accordance with an example embodiment. As illustrated in FIG. 7, sensor data is provided, for example, sensor data from a home insured by an insurance company operating the apparatus illustrated in FIG. 7. The sensor data is received and processed by sensor data processing system 710. The sensor data processing system 710 includes an input/output module 720 that can receive data as well as send data back to the sensors or to a person, for example, through an email account. Thus, in addition to receiving data on the fire conditions in the vicinity of a home, the homeowner can be provided with fire mitigation procedures as an output from this system.

The sensor data processing system 710 further includes a data processor 725 and a database 740 coupled to the data processor. A fire risk computation engine 735, a fire mitigation procedures engine 730, and an insurance engine 745 can be utilized to practice the methods described herein. Utilizing sensor data, a fire risk for a home can be computed, various fire mitigation procedures can be provided to a homeowner, with compliance verified by the insurer using the sensor data, and an insurance premium can be computed. The insurance premium can depend on the implementation of fire mitigation procedures, changes in the fire risk, and the like. Thus, using sensor data as inputs, the sensor data processing system 710 can compute the fire risk associated with a home as well as the corresponding insurance premiums for the home.

The embodiments described herein may be implemented in an operating environment comprising software installed on any programmable device, in hardware, or in a combination of software and hardware.

Although embodiments have been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A method of providing an insurance policy for a home, the method comprising:
providing a computer having a processor;
deploying a plurality of sensors in a vicinity of the home;
receiving data from the plurality of sensors, wherein the data comprises information related to environmental factors associated with the home;
transmitting the information related to the environmental factors to the computer;
computing, by the processor, a fire risk associated with the home using the information; and
computing, by the processor, an insurance premium for the insurance policy using the computed fire risk;
wherein the insurance premium is valid for a period of time less than a month in duration.

2. The method of claim 1 wherein the plurality of sensors comprise at least one sensor mounted on the home.

3. The method of claim 1 wherein the plurality of sensors comprise at least two of a humidity sensor, a temperature sensor, a wind sensor, or a camera.

4. The method of claim 1 wherein deploying a plurality of sensors comprises providing the plurality of sensors to an owner of the home prior to installation of the plurality of sensors by the owner of the home.

5. The method of claim 1 further comprising:
receiving second data from a second plurality of sensors deployed in the vicinity of a second home, wherein the second data comprises second information related to environmental factors associated with the second home;
transmitting the second information to the computer;
computing, by the processor, a modified fire risk associated with the home using the second information; and
computing, by the processor, a modified insurance premium for the home using the modified fire risk.

6. The method of claim 1 further comprising providing fire mitigation procedures to a customer having the insurance policy using the computed fire risk.

7. A method of offering an insurance policy on a property to a user, the method comprising:
providing a computer having a processor;
receiving an address of the property from the user;
accessing an insurance database;
determining, using the insurance database, that the property is uninsurable, wherein the address of the property is located within a general vicinity of high fire risk;
receiving data from a plurality of sensors associated with the property;
computing, by the processor, a fire risk associated with the property;
computing, by the processor, a policy premium using the computed fire risk; and
offering the insurance policy to the user.

8. The method of claim 7 wherein the plurality of sensors comprise at least one sensor mounted on a home located on the property.

9. The method of claim 7 wherein the plurality of sensors comprise at least two of a humidity sensor, a temperature sensor, a wind sensor, or a camera.

10. The method of claim 7 wherein the policy premium is valid for a period of time less than a month in duration.

11. The method of claim 7 further comprising receiving data from a plurality of sensors associated with the home, wherein computing the fire risk comprises using the received data.

12. The method of claim 7 further comprising providing fire mitigation procedures to the user using the computed fire risk.

13. A method of managing insurance premiums for a home, the method comprising:

providing a computer having a processor;

deploying a plurality of sensors in a vicinity of the home;

receiving data from the plurality of sensors, wherein the data comprises information related to environmental factors associated with the home;

analyzing, by the processor, the data to determine that one or more fire mitigation procedures have been performed in association with the home to reduce a fire risk associated with the home;

transmitting information related to the one or more fire mitigation procedures to the computer;

computing, by the processor, the fire risk associated with the home using the information related to the one or more fire mitigation procedures and the information related to the environmental factors associated with the home; and computing, by the processor, an insurance premium for the insurance policy using the computed fire risk.

14. The method of claim 13 wherein the plurality of sensors comprise at least one sensor mounted on the home.

15. The method of claim 13 wherein the plurality of sensors comprise at least two of a humidity sensor, a temperature sensor, or a wind sensor.

16. The method of claim 13 wherein the plurality of sensors comprise a camera.

17. The method of claim 13 wherein the one or more fire mitigation procedures include removal of flammable materials from within a predetermined vicinity of the home.

18. The method of claim 17 wherein the predetermined vicinity of the home comprises a 100' defensible space zone surrounding the home.

19. The method of claim 13 further comprising transmitting information on additional fire mitigation procedures to a customer having the insurance policy.

20. The method of claim 1 wherein the home is located in an area of high wildfire risk.

21. The method of claim 13 further comprising determining a fuel load in the vicinity of the home using the data from the plurality of the sensors.

* * * * *